United States Patent [19]
Weiner

[11] 3,859,540
[45] Jan. 7, 1975

[54] SYSTEM FOR REMOTE CONTROL OF THE STARTING OF MOTOR VEHICLES INCLUDING VISUAL INDICATION OF ACCELERATOR LINKAGE AND STARTER CIRCUIT ACTUATION

[76] Inventor: Irving Weiner, 503 Rhode Island Ave., Cherry Hill, N.J. 08034

[22] Filed: Dec. 13, 1973

[21] Appl. No.: 424,215

[52] U.S. Cl. .................... 290/38, 290/37, 123/179
[51] Int. Cl. ........................................... H02p 9/04
[58] Field of Search ............... 123/179 B; 343/225; 290/37, 38, 36, 1; 325/36

[56] References Cited
UNITED STATES PATENTS
3,577,164  5/1971  Baratelli .............................. 290/37
3,603,802  9/1971  Petric .................................. 290/37
3,633,040  1/1972  Baxter ................................. 290/37

*Primary Examiner*—G. R. Simmons
*Attorney, Agent, or Firm*—Morton C. Jacobs

[57] ABSTRACT

A wireless operated relay control is used for automatic starting of an automobile engine from remote distances. An automatic cranking cycle is initiated by an operator with preliminary control of the accelerator pedal where desired, and with fast idle termination after starting, as well as automatic turn-off after the engine is running for a pre-set time period. A visual display provides separate lights visually indicating activation of the accelerator pedal, cranking of the engine, running of the engine, and fast idle.

6 Claims, 1 Drawing Figure

Patented Jan. 7, 1975
3,859,540
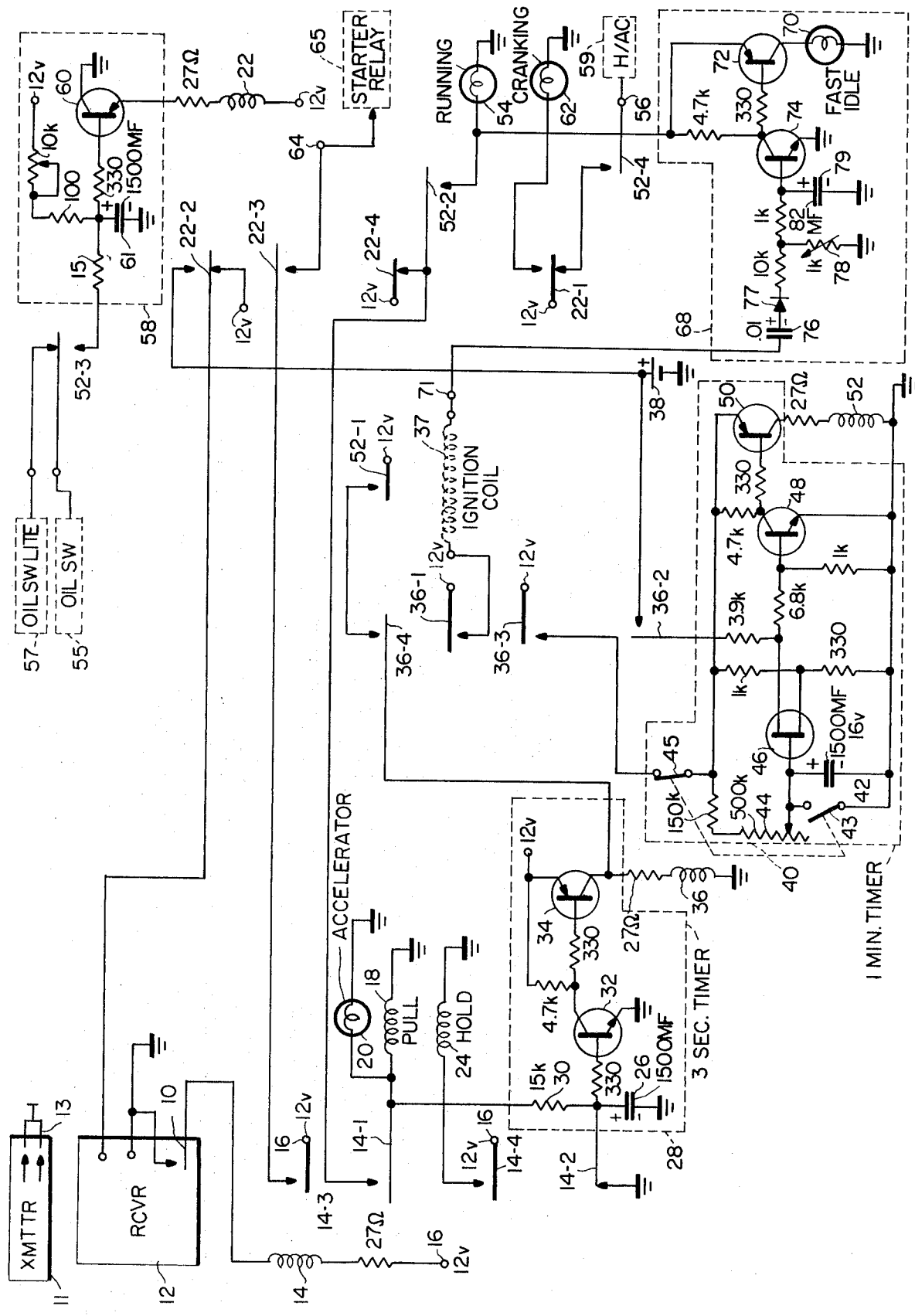

SYSTEM FOR REMOTE CONTROL OF THE STARTING OF MOTOR VEHICLES INCLUDING VISUAL INDICATION OF ACCELERATOR LINKAGE AND STARTER CIRCUIT ACTUATION

BACKGROUND OF THE INVENTION

This invention relates to an electrical system for actuation and starting of a vehicle such as an automobile by remote control.

The ability to start an automobile from a remote location has a number of associated conveniences. In the winter, it would make it possible to warm up the engine, and even the car itself, without leaving a heated building. In the summer, similarly, the air-conditioning mechanism of the car can be started without leaving a cooled building. In addition, where there is danger that a bomb may be installed in the vehicle, the operator may safely start the engine from a distance.

Prior art systems for remote engine start-up have been suggested in U.S. Pat. Nos. 3,657,720, 3,455,403, 3,054,904, and 2,887,588.

A practical form of remote starting system is needed that may be used in the field on a wide variety of automobiles, readily attached to the automobiles, and used by the ordinary automobile driver. It has been found that the starting cycles of automobiles can be quite different, and the starting cycle of a particular automobile can vary with the condition of its engine and the weather, among other things. Therefore, a remote starting system places special requirements on the electrical system and its power supply, and may require a means of return communication to the operator of the starting operation.

SUMMARY OF THE INVENTION

Accordingly, it is among the objects of this invention to provide a new and improved system for remote starting of a motor vehicle.

Another object is to provide a new and improved remote vehicle starting system carrying a practical electrical system.

Another object is to provide a new and improved remote engine starting system having visual indication to the operator for remotely observing the cycle of starting operation.

In accordance with one embodiment of this invention, a wireless operated relay control is provided for installation in a motor vehicle having an internal combustion engine. The relay control provides for an automatic engine cranking and starting cycle which is initiated by the wireless operation, and which permits, as a preliminary to the engine cranking cycle, the operator to remotely activate the accelerator pedal to feed gas to the engine. Likewise, after the engine has been started, the operator can activate the gas pedal to terminate the fast idle and otherwise to feed gas. A visual display is provided which may be mounted on the automobile for remote observation by the operator. A first light is lit to show that the transmitter signal is reaching the receiver and that the accelerator pedal is being activated. A second light shows that the engine is cranking, and a third light shows that it is running. A fourth light is lit when the engine has started in a fast idle. These lights are color coded for ready identification. The operating cycle is timed for automatic turn-off if the operator does not arrive at the vehicle within a preset time period to continue operation of the engine. The relay control is operated from the conventional battery power supply of the automobile and, in addition, a boost battery is provided to insure operation of the wireless receiver and the relay control during the engine cranking operation when the automobile battery is heavily loaded.

BRIEF DESCRIPTION OF THE DRAWING

The foregoing and other objects of this invention, the various features thereof, as well as the invention itself, may be more readily understood from the following description when read together with the accompanying drawing, in which:

The single FIGURE thereof is a schematic circuit of a system for remote starting of a motor vehicle embodying this invention.

DESCRIPTION OF A PREFERRED EMBODIMENT

In the embodiment of the invention shown in the drawing, the remote actuation of the starting mechanism of the motor vehicle engine (which is assumed to be a conventional gasoline engine) is by means of a remotely actuated switch 10, which in this embodiment is shown as being actuated by a radio receiver 12. Such devices are well known in the art, and consist of a radio transmitter 11, operated by a manual switch 13, which supplies a suitably coded signal to the receiver 12 which, upon recognition and receipt of such signal, actuates the switch 10. The actuation of the switch 10 completes a connection to ground for a relay 14, the other terminal of the coil of which is connected to the terminal 16 of a suitable voltage supply, which in a preferred form of the invention is the 12-volt battery supply of the conventional four to eight cylinder engine in a passenger automobile.

With the completion of the energization circuit for relay coil 14, the associated contacts of that relay are actuated. Contact 14-1 is closed to energize a solenoid 18 which is mechanically coupled to the accelerator linkage to actuate it as though it were being depressed by a driver. This action has the effect of feeding gas to the carburetor and activating the automatic choke prior to any starter motor action. The closure of contact 14-1 also lights a lamp 20 (which is preferably color coded, e.g. white) to indicate the status of this operation. The fixed contact for blade 14-1 is connected through a contact 22-4 of another relay 22 to the 12-volt supply. Contact 14-4 is closed to energize the coil 24 from the 12-volt power supply, which coil is associated with the solenoid and is effective to hold the plunger thereof in actuated condition, after the larger pull coil 18 has done the earlier and heavier task of the actuation. Contact 14-3 is closed to connect the 12-volt supply to a contact 22-3 of relay 22, which contact is normally open and is subsequently closed with energization of the relay coil 22.

Contact 14-2 is normally closed and is opened, when relay 14 is energized, to remove the ground potential from a capacitor 26 of a timer circuit 28, whereupon the 12-volt supply can be connected to contact 14-1 and a charging resistor 30 to initiate the charging operation of that capacitor. The charging operation is sufficiently slow to provide a long time delay of the order of 3 seconds, sufficient time in which to complete the starting operation. Thereupon, the capacitor 26 is charged to a voltage which is such as to bias the base emitter path of transistor 32 to the "on" condition, which in turn drives transistor 34 into the "on" condition to energize relay coil 36, which is connected in its collector circuit.

With the energization of relay coil 36, four sets of contacts are closed. Contact 36-1 connects the 12-volt battery to the ignition coil 34 of the engine. Contact 36-2 connects one terminal of a booster battery 38 (the other terminal of which is grounded) to an intermediate terminal of a timer circuit 40. Thereby, the critical operating voltage of this timing circuit is maintained at 12 volts, even though the 12-volt supply (supplied by contact 36-3 to the timer circuit 40) is reduced to approximately 8 volts during the time that the engine is being cranked. Without the boosting voltage of battery 38, the timing cycle of timer 40 may be substantially impaired if not completely disrupted. Contact 36-3 connects the 12-volt battery via manual switch 45 as operating voltage for the transistors of timer 40 and also via resistor 44 to timing capacitor 42, which is shunted by manual switch 43 ganged to switch 45. With switch 43 closed and switch 45 open, the timer 40 and the relay control are disabled as for normal driving. In the opposite states, the timer 40 and relay control are in proper condition for remote control and starting.

The timer 40 can be adjusted by resistor 44 over several minutes (e.g. 1 minute to 10 minutes) and is used to set a time during which the engine continues to run (once started) and, therefore, is turned off if it is left unattended. The timing capacitor 42 is charged through a variable resistor 44, which is adjusted to set the desired time period. FET transistor 46 is normally turned off (and remains so until the charge threshold is reached). Thus, upon closure of contacts 36-2 and 36-3, transistor 48 is energized to turn on driving transistor 50 and energize relay 52. That is, the energization of relay 36 directly leads to the turn-on of transistor 48, which in turn forward biases the base emitter path of resistor 50 to supply energizing current from contact 36-3 (then closed) to relay 52. When capacitor 42 is charged by the variable resistor 44 to turn on detecting transistor 46, the base emitter path of transistor 48 is then back biased and thereby its emitter path is blocked to turn off transistor 50 and de-energize the relay 52. Contact 36-4, when closed, with the energization of relay coil 36 provides a holding circuit for the coil 36 via the closed contact 52-1 of relay 52, which was energized at the beginning of the timing cycle of timer 40.

Also with the closure of relay 52, contact 52-2 connects the 12-volt supply via contact 22-4 to the engine-running lamp 54 (which is color coded green), which operation takes place with the energization of relay 22 and the closing of its contacts. Contact 52-4 is closed to connect the 12-volt supply via contact 22-1 to terminal 56 which is connected to the heater or air-conditioner to turn either on. Contact 52-3 is a single pole, double-throw contact, which quiescently is in a position connecting the oil pressure switch 55 to the associated oil pressure light 57 (customarily provided on the vehicle dashboard). With actuation of contact 52-3 to its other position, the ground potential of the oil switch 55 is supplied to a timer 58 and forward biases transistor 60 of that timer to energize relay coil 22.

With the operation of relay 22 (which occurs substantially simultaneously with the initiation of operation of timer 58 by the ground potential from the oil pressure switch 55), contact 22-1 is switched to provide the 12 volts for energizing the engine-cranking lamp 62. Contact 22-2 switches the radio receiver power supply from the battery of 12 volts of the motor vehicle to the booster battery 38. Thereby, during the starting operation the voltage supply to the radio receiver is maintained at a fixed level for reliable operation even though the motor vehicle battery voltage drops to approximately 8 volts; the latter voltage is so low that it tends to result in failure of operation of the radio receiver. Contact 22-3 is closed to apply the battery voltage from contact 14-3 to the starter relay 65 of the motor vehicle, which in turn energizes the starter motor of the vehicle to crank the engine. During the cranking operation, contact 22-4 is open to break the energization circuit for the pull coil 18 of the solenoid for the accelerator pedal. Thereby, the ten amps of coil 18, which would load down the motor vehicle battery heavily during the engine cranking operation, is dispensed with, and the two-amp requirement of the holding coil 24 is sufficient to maintain the pedal depressed during start-up. In addition, the contact 22-4 opens to turn off the engine running lamp 54 which is coded green.

For purposes of detecting when the fast idle operation occurs, a detector circuit 68 is connected to the distributor side 71 of the ignition coil. The latter terminal 71, during idling of the engine, supplies varying voltages which assume either of two approximate values (e.g. 8 volts and 6 volts) depending upon whether the idle is fast or slow. This ignition coil voltage is rectified via diode 77 and divided down variably by a setting of potentiometer 78 to provide an adjustment which can vary for each car in which it is installed. The detected voltage is smoothed via filter 79 and is effective to turn on a first transistor 74 which in turn turns on a second transistor 72 which lights the fast idle lamp 70 connected in the collector path of the second transistor 72. The operating voltage for this detector circuit is supplied by contact 52-2. When the fast idle lamp 70 is lit, the operator can remotely actuate the accelerator pedal by another transmitted signal to energize the pull solenoid 18 so as to deactivate the automatic choke, and thereby reduce the idling speed.

In use, an On-Off switch for the power supply of the control unit is operated to the "on" position when an operator leaves the car and expects to be operating it from a remote location. From the remote location, the operator actuates the transmitter 11 by pressing the push button 13, which results in a coded signal being transmitted to the receiver 12 and a consequent closure of its switch 10, which results in the operation of relay 14. The accelerator pedal lamp 20 lights, and operation of timer 28 is initiated, which after a few seconds time delay results in the energization of relay 36. If the transmitter switch 13 is released before the delay timer 28, receiver switch 10 opens and the relay 14 is de-energized to terminate the operation of timer 28. In addition, solenoid 18 is de-energized so that the accelerator pedal returns to its normal position, and the associated lamp 20 is extinguished. Thus this operation of actuating transmitter switch 13 momentarily and releasing it corresponds to that of an operator in the car depressing the accelerator pedal with his foot and then releasing it, which has the effect of feeding gas to the carburator and activating the automatic choke. This operation of switch 13 may be repeated one or more times as may be required for the particular automobile, and the operator from a remote location can observe the lamp 20 turning on and off as he controls the accelerator pedal.

When the operator holds switch 13 closed for more than the time delay (e.g. 3 seconds) of timer 28, relay 36 is energized, which places battery voltage on the ignition coil via switch 36-1, energizes relay 52 and also initiates operation of timer 40 via switches 36-3 and 36-2. The energization of relay 52 results in a holding circuit for relay 36 via switches 52-1 and 36-4, and the closure of switch 52-3 to initiate operation of timer 58 and to energize relay 22. Thereupon, the crank lamp 62 is illuminated via switch 22-1 to let the operator know that the cranking of the engine has started, the latter operation taking place with the energization of the starter relay 65 via switch 22-3. In addition, the opening of switch 22-4 de-energizes the solenoid coil 18 to avoid the current drain of that solenoid, so that the accelerator pedal remains depressed via the hold coil 24 of that solenoid. The pedal lamp 20 is extinguished to tell the operator that this operation has taken place. With the cranking of the engine, the oil switch is opened and the ground potential on switch 52-3 is removed, and the capacitor 61 of timer 58 begins to charge. The delay time supplied by timer 58 is such that transistor 60 remains conducting to keep relay 22 energized until the oil pressure in the engine has built up sufficiently to activate the oil pressure switch. Timer 58 has an adjustable resistor 59 so that the time delay can be set to correspond with the particular oil pressure build-up of the motor vehicle in which it is installed.

When the oil pressure has been built up sufficiently, the timer 58 operates to de-energize relay 22 and initiate the next part of the cycle of operations. Switch 22-4 then recloses, which lights the engine-running lamp 54 as well as energizes the solenoid coil 18. Switch 22-3 opens to remove the energization from starter relay 65, and the engine-crank lamp 62 is extinguished via the now open contact of switch 22-1, which closes on its opposite contact to initiate operation of the heater or air conditioner 57 via terminal 56 and closed switch 52-4. Switch 22-2 restores the 12-volt battery as the power service for receiver 12.

When the operator sees the engine-running lamp 54 turn on, the switch 13 of the transmitter 11 is released, which in turn opens the switch 10 of the receiver and de-energizes relay 14 to open the associated switches thereof and release the accelerator pedal by de-energizing its coils, and thereby permit a normal idling operation after starting. With the reclosure of switch 14-2, the input to timer 28 is grounded, which discharges the timing capacitor 26 and prepares it for the next sequence of operations.

At this time, the engine is running and the associated running lamp 54 is lit. If the engine has started to run in a fast idle condition, this condition is detected by detector circuit 68, the latter detecting the corresponding higher voltage at the terminal 71 of the ignition coil 37 at fast idle in contrast to the lower voltage at the slow idle.

To terminate the fast idle, the operator momentarily actuates switch 13 to energize relay 14, the latter energizes pull solenoid 18 to depress the accelerator pedal momentarily and deactivate the automatic choke, which places the engine in the slow idle condition. At this time the engine runs at a slow idle with the running lamp 54 being lit and the others being extinguished and with timer 40 operating to provide a maximum time period in which the car can operate with the engine running; if the operator does not arrive (within the 1 to 10 minute delay of timer 40) to maintain the engine operation, timer 40 runs through its cycle and extinguishes the relay 52. Thereby, relay 36 is extinguished via switch 52-1, the lamp 54 is extinguished via switch 52-2, the oil switch terminal is returned to the contact for the oil switch light via switch 52-3, and the heater or air conditioner is turned off via switch 52-4.

The cycle of starting the motor vehicle is completed once running lamp 54 is lit, and the operator can open switch 13. If the latter is opened at any earlier portion of the cycle before the engine has fired, the cycle stops. That is, relay 14 is de-energized, followed by relays 36, 52 and 22 also being de-energized. Thus, if the cranking of the engine does not start it in a reasonable time, the operator can stop it. Moreover, the operator can control the cranking to produce a number of short periods thereof rather than one long cranking operation, as desired.

Various modifications of this invention will be apparent to those skilled in the art from the above description. For example, to adapt the relay control to an automobile with a fuel injection system, certain modifications are made to insure that the gas pedal is not activated until the engine starts. That is, in timer 28 the charging resistor 30 is bypassed by a direct connection. Thereby, the time delay of timer 28 is dispensed with and relay 36 operates immediately upon operation of relay 14. In addition, contact blade 14-4 is connected to the normally open fixed contact with switch blade 14-3 (instead of to the 12-volt battery). Thus the gas pedal is not activated until the engine is cranked. If desired, the connections can be further modified so that the solenoid operates only after the engine is running. When the operator releases switch 13 from the transmitter, the gas pedal is deactivated and can be reactivated merely be reclosing switch 13.

In automobiles that do not have an oil pressure switch, the ignition-coil voltage is used to detect the difference between the engine cranking and engine running conditions. This ignition-coil voltage is zero when the engine is quiescent, is an intermediate voltage during cranking, and a higher voltage during running condition. This voltage at ignition-coil terminal 71 is supplied to a circuit similar to timer 40 except that its input is capacitor-coupled to terminal 71, relay 22 is connected in the collector emitter path of the transistor comparable to transistor 50, preferably in the emitter path, and the collector of the latter is returned to ground. In addition, the operating voltage for the circuit is supplied via the normally open fixed contact for blade 36-1. Thus, as soon as relay 36 is energized and contact 36-1 closes, the distributor detector circuit operates to turn on the transistors of the detector and thereby energize relay 22, which applies a voltage to the starter relay 65, as described above, to start the cranking operation. As soon as the engine starts, the output voltage for terminal 71 jumps to the higher voltage, which is effective to trigger the FET transistor in the distributor detector circuit, which turns off the transistors thereof and therefore the relay 22. In other respects the operation is the same as described above.

In the drawing, a particular operative embodiment of the invention is illustrated with particular component values. This particular embodiment is exemplary only and other values of components and other circuit forms will be apparent to those skilled in the art. For example, with the illustrated embodiment, 6-volt relays have been used reliably notwithstanding the severe reduction in operating voltage during the starter operation. Relays of 12-volt characteristic were not reliable, however.

Thus a new and improved system for remote starting of a motor vehicle has been provided. A transmitter electrical system is devised therefor, and visual indicators are provided for remote observation by the operator to insure proper control of the starting operation. A visual display is provided for the convenience of starting an engine, showing signal received, actuation of the accelerator pedal, cranking of the engine, running of the engine, and fast idle, when it is impossible to hear the engine cranking or running.

What is claimed is:

1. A system for remote-control starting of an internal combustion engine in a motor vehicle having an accelerator linkage and a starter circuit, said system including first relay means responsive to a radio control signal for actuating said accelerator linkage, second relay means responsive after a certain time delay to operation of said first relay means for operating said starter circuit, and separate visual display means operative respectively with said first and second relay means for respectively indicating to a remote operator the actuation of said accelerator linkage and the operation of said starter circuit.

2. A remote-control system as recited in claim 1 wherein said first relay means is responsive to the termination of said radio control signal for releasing said accelerator linkage, whereby an operator can initiate and terminate said radio control signal in less than said certain time delay to feed gas and prime the engine prior to operation of said starter circuit.

3. A remote-control system as recited in claim 2, and further comprising a third relay means responsive to a second, longer time delay for disconnecting the engine battery from the ignition coil, whereby after starting of the engine it continues to run unattended only for said second time delay.

4. A remote-control system as recited in claim 1, and further comprising means for detecting fast and slow idle conditions in the running engine and visual display means for indicating to a remote operator said idle engine condition.

5. A remote-control system as recited in claim 1, wherein said second relay means includes visual display means responsive to the running of the engine after starting thereof for indicating to a remote operator said engine running condition.

6. A remote-control system as recited in claim 1, and further comprising a radio receiver for said radio control signal, and wherein said second relay means includes means for supplying an auxiliary battery voltage to said radio receiver during operation of said starter circuit.

* * * * *